US010171965B2

(12) United States Patent
Jakobsson et al.

(10) Patent No.: US 10,171,965 B2
(45) Date of Patent: Jan. 1, 2019

(54) MICRO-PAYMENT SCHEME ENCOURAGING COLLABORATION IN MULTI-HOP CELLULAR NETWORKS (75) Inventors: Bjorn Markus Jakobsson, Bloomington, IN (US); Jean-Pierre Hubaux, Préverenges (CH); Levente Buttyán, Szentendre (HU)

(73) Assignee: EMC IP Holding Company LLC, Hopkinton, MA (US)

(*) Notice: Subject to any disclaimer, the term of this patent is extended or adjusted under 35 U.S.C. 154(b) by 2151 days.

(21) Appl. No.: 10/996,997

(22) Filed: Nov. 24, 2004

(65) Prior Publication Data
US 2005/0165696 A1   Jul. 28, 2005

Related U.S. Application Data (60) Provisional application No. 60/524,750, filed on Nov. 25, 2003.

(51) Int. Cl.
*H04W 4/24* (2018.01)
*G06Q 20/06* (2012.01)
(Continued)

(52) U.S. Cl.
CPC .............. *H04W 4/24* (2013.01); *G06Q 20/06* (2013.01); *G06Q 20/29* (2013.01); *G06Q 20/32* (2013.01); *G06Q 20/367* (2013.01); *G06Q 20/3823* (2013.01); *G06Q 20/38215* (2013.01); *H04L 9/3236* (2013.01); *H04M 15/68* (2013.01);
(Continued)

(58) Field of Classification Search
CPC ...................................................... H04W 4/24
See application file for complete search history.

(56) References Cited

U.S. PATENT DOCUMENTS 5,771,289 A * 6/1998 Kuzma ................. G06Q 20/06
380/51
6,088,687 A * 7/2000 Leleu ................. G06Q 30/0283
379/114.2
(Continued)

FOREIGN PATENT DOCUMENTS

WO    WO-9733404 A1 *  9/1997  ......... G06Q 30/0283
WO    WO-2005064864 A1 *  7/2005  ............. H04L 45/04

OTHER PUBLICATIONS

"Celltel launches Sri Lanka's first secure mobile wallet", story from Sri Lanka Daily Mirror, 2002.*
(Continued)

*Primary Examiner* — Jacob C. Coppola
(74) *Attorney, Agent, or Firm* — Ryan, Mason & Lewis, LLP (57) ABSTRACT In a communication system having a number of base stations and user devices, a sending user device comprising a processor and a memory is configured to generate a packet or other communication for forwarding to a receiving user device via one or more intermediary user devices of the system. The forwarding path of the communication may involve one or more of the base stations. A payment token is associated with the communication, such that at least one of the intermediary user devices can generate a payment claim based on the payment token. The payment token is independent of the particular identities of the one or more intermediary user devices of the system.

20 Claims, 3 Drawing Sheets (51) Int. Cl.
  G06Q 20/22 (2012.01)
  G06Q 20/32 (2012.01)
  G06Q 20/36 (2012.01)
  G06Q 20/38 (2012.01)
  H04L 9/32 (2006.01)
  H04M 15/00 (2006.01)
  H04W 88/04 (2009.01)

(52) U.S. Cl.
  CPC ...... H04L 2209/56 (2013.01); H04L 2209/80 (2013.01); H04M 2215/0196 (2013.01); H04M 2215/2026 (2013.01); H04M 2215/32 (2013.01); H04W 88/04 (2013.01)

(56) References Cited

U.S. PATENT DOCUMENTS

| | | | | |
|---|---|---|---|---|
| 7,203,657 | B1* | 4/2007 | Noam | G06Q 20/00 235/375 |
| 7,222,193 | B2* | 5/2007 | Stringer | G06Q 20/06 709/203 |
| 7,493,285 | B2* | 2/2009 | Bouthors | G06Q 20/02 705/35 |
| 8,744,936 | B2* | 6/2014 | Guion | G06Q 20/102 455/406 |
| 2002/0040342 | A1* | 4/2002 | Bouthors | 705/40 |
| 2002/0049644 | A1* | 4/2002 | Kargman | 705/26 |
| 2002/0123359 | A1* | 9/2002 | Wei et al. | 455/466 |
| 2004/0059676 | A1* | 3/2004 | Rozendaal | G07B 17/00362 705/50 |
| 2004/0243475 | A1* | 12/2004 | Aronsson et al. | 705/26 |
| 2005/0113066 | A1* | 5/2005 | Hamberg | H04L 12/5895 455/411 |
| 2005/0141545 | A1* | 6/2005 | Fein | H04B 7/0617 370/445 |
| 2005/0165696 | A1* | 7/2005 | Jakobsson | G06Q 20/06 705/65 |
| 2006/0089139 | A1* | 4/2006 | Allegretti | 455/428 |
| 2007/0133488 | A1* | 6/2007 | Muthuswamy et al. | 370/338 |

OTHER PUBLICATIONS

"Performance Analysis of the CONFIDANT Protocol (Cooperation of Nodes: Fairness in Dynamic Ad-hoc NeTworks)", a paper by Sonja Buchegger and Jean-Yves Le Boudec, published in 2002 in Proceedings of the ACM International Symposium on Mobile Ad Hoc Networking and Computing.*

"Computer Networking: A Top-Down Approach Featuring the Internet", 3$^{rd}$ edition. Kurose, James F and Keith W. Ross. 2004. ISBN 0-321-26976-4.*

"Downloading Linux ISO Images", The America's Intelligence Wire, Oct. 16, 2003. Schaffler, Rhonda.*

Handbook of Applied Cryptography. Menezes et al. CRC Press, 1996. Available at <www.cacr.math.uwaterloo.ca/hac>. Chapter 9 included.*

Ex parte James Prescott Curry; Board of Patent Appeals and Interferences, Appeal No. 2005-0509. Dated Jun. 30, 2005.*

"A Micro-Payment Scheme Encouraging Collaboration in Multi-Hop Cellular Networks"; Jakobsson, Markus et al. Acquired from <http://www.hit.bme.hu/~buttyan/publications/JakobssonHBO3fc.pdf>. Presented at 7th International Financial Cryptography Conference (FC), Gosier, Guadeloupe, French West Indies, Jan. 27-30, 2003.*

IEEE 100—The Authoritative Dictionary of IEEE Standards Terms, 7$^{th}$ Edition. Institute of Electrical and Electronics Engineers, 2000. ISBN 0-7381-2601-2. Front matter (pp. i-x), pp. 216, 217, 501, and 502 included.*

Ben Salem et al., "A Charging and Rewarding Scheme for Packet Forwarding in Multi-hop Cellular Networks," MobiHoc '03, all pages. (Year: 2003).*

Jakobsson et al., "A Micro-Payment Scheme Encouraging Collaboration in Multi-hop Cellular Networks," R.N. Wright (Ed.): FC 2003, LNCS, 2742, pp. 15-33, Springer-Verlag Berlin Heidelberg. (Year: 2003).*

S. Marti et al., "Mitigating Routing Misbehavior in Mobile Ad Hoc Networks," Proc. Sixth ACM International Conference on Mobile Networking and Computing, Boston, 11 pages, Aug. 2000 (Mobicom 2000).

S. Buchegger et al., "Performance Analysis of the CONFIDANT Protocol (Cooperation of Nodes: Fairness In Dynamic Ad-hoc NeTworks)," Proc. Third ACM International Symposium on Mobile Ad Hoc Networking and Computing, Lausanne, 11 pages, Jun. 2002 (MobiHoc 2002).

S. Zhong et al., "Sprite: A Simple, Cheat-Proof, Credit-Based System for Mobile Ad-Hoc Networks," Technical Report Yale/DCS/TR1235, Department of Computer Science, Yale University, 11 pages, Jul. 2002.

L. Buttyán et al., "Stimulating Cooperation in Self-Organizing Mobile Ad Hoc Networks," ACM Journal for Mobile Networks (MONET), special issue on Mobile Ad Hoc Networks, vol. 8, No. 5, pp. 1-23, Oct. 2003.

Y. Zhang et al., "Intrusion Detection in Wireless Ad-Hoc Networks,"Proceedings of the Sixth ACM International Conference on Mobile Networking and Computing, Boston, 9 pages, Aug. 2000 (Mobicom 2000).

* cited by examiner

MICRO-PAYMENT SCHEME ENCOURAGING COLLABORATION IN MULTI-HOP CELLULAR NETWORKS

CROSS-REFERENCE TO RELATED APPLICATIONS

The present application claims the priority of U.S. Provisional Patent Application Ser. No. 60/524,750, filed Nov. 25, 2003, the disclosure of which is incorporated by reference herein.

FIELD OF THE INVENTION

The present invention relates generally to communication systems, and more particularly to techniques for encouraging a given system user to forward packets or other communications on behalf of other system users.

BACKGROUND OF THE INVENTION

Multi-hop cellular networks typically rely on a set of base stations connected to a backbone network, as in conventional cellular networks, and the mechanisms of "ad hoc" networks, in which packets are relayed hop by hop between peer devices.

The expected benefits of such an approach with respect to conventional cellular networks are multifold. First, the energy consumption of mobile devices can be reduced. Indeed, the energy consumption required for radio transmission grows super-linearly with the distance at which the signal can be received. Therefore, the battery life of mobile devices can be substantially extended if packets are routed in small hops from the originator to the base station. Second, as an immediate positive side-effect of the reduced transmission energy, interference is reduced. Third, if not too remote from each other, mobile devices can communicate independently from the base station infrastructure. Fourth, the number of fixed antennas can be reduced. Fifth and finally, the coverage of the network can be increased using such an approach. However, while all participating mobile devices stand to benefit from such a scheme, a cheater could benefit even more, by requesting others to forward his or her packets, but avoiding the transmission of packets for other users.

Although attractive at first sight, multi-hop cellular networks raise a number of problems. For example, in conventional cellular networks, base stations usually are in charge of channel allocation and of the synchronization and power control of mobile devices. To accomplish this task, they take advantage of their direct communication link with each and every mobile device currently visiting their cell. It is quite difficult to extend these operating principles to multi-hop cellular networks. A similar observation can be made in the framework of wireless LANs. For example, in an IEEE 802.11 network, a station can work either in infrastructure mode, with one or several access points, or in ad hoc mode, but not in both.

Recently, attempts have been made to address the problem of fostering cooperation, especially for packet forwarding, in mobile ad hoc networks. For example, in S. Marti et al., "Mitigating Routing Misbehavior in Mobile Ad Hoc Networks," Proc. Sixth ACM International Conference on Mobile Networking and Computing, Boston, August 2000 (Mobicom 2000), the authors consider the case in which some malicious nodes agree to forward packets but fail to do so. In order to cope with this problem, they propose two mechanisms: a watchdog, in charge of identifying the misbehaving nodes, and a path rater, in charge of defining the best route circumventing these nodes. Unfortunately, this scheme has the drawback that it does not discourage misbehavior.

Another proposal, described in S. Buchegger et al., "Performance Analysis of the CONFIDANT Protocol (Cooperation of Nodes: Fairness in Dynamic Ad-hoc NeTworks)," Proc. Third ACM International Symposium on Mobile Ad Hoc Networking and Computing, Lausanne, June 2002 (MobiHoc 2002), leverages on the reputation of a given user, based on the level of cooperation that user has exhibited so far. In this scheme, users can retaliate against a selfish user by denying service to the selfish user. A drawback of this type of solution is that a set of colluding cheaters can give each other large quantities of positive feedback, while giving anybody criticizing a member of the collusion negative feedback, both as a deterrent and as a way to reduce the credibility of the feedback the honest user gave.

Yet another conventional approach is described in S. Zhong et al., "Sprite: A Simple, Cheat-proof, Credit-based System for Mobile Ad Hoc Networks," Technical Report Yale/DCS/TR1235, Department of Computer Science, Yale University, July 2002. A problem with the Sprite approach is that it does not address the case of multi-hop cellular communications. Also, although Sprite avoids assumptions on tamperproofness while still proving security statements for a stated model, it has potential drawbacks in terms of its overhead, security, and topology requirements. In particular, the Sprite approach requires a fair amount of computation and storage, making it vulnerable to denial of service attacks, and unsuitable for use in a "lightweight" device, i.e., a device having limited processing power, memory or other computational resources. Moreover, it does not consider attacks involving manipulation of routing tables. Finally, the Sprite approach is based on a reputation mechanism that will only be meaningful in rather dense networks, but it is not clear that a typical practical multi-hop cellular network exhibits this property.

A further approach is described in L. Buttyan et al., "Stimulating Cooperation in Self-Organizing Mobile Ad Hoc Networks," ACM Journal for Mobile Networks (MONET), special issue on Mobile Ad Hoc Networks, October 2003, Vol. 8, No. 5. However, this approach relies on tamperproof hardware, and is vulnerable to collusion.

Accordingly, improved techniques are needed for encouraging collaboration between users in multi-hop cellular networks.

SUMMARY OF THE INVENTION

The present invention meets the above-noted need by providing, in a number of illustrative embodiments, an architecture for fostering collaboration between rational but selfish nodes of multi-hop cellular networks, including mechanisms to encourage honest behavior and to discourage dishonest behavior among such nodes.

In accordance with one aspect of the invention, a communication system includes a plurality of base stations and a plurality of user devices. A sending user device comprising a processor and a memory is configured to generate a packet or other communication for forwarding to a receiving user device via one or more intermediary user devices. The one or more intermediary user devices may comprise, for example, a plurality of intermediary user devices in a multi-hop uplink path between the sending user device and one of the base stations. A payment token is associated with the communication, such that at least one of the intermediary user devices can generate a payment claim based on the payment token. The payment token is independent of the particular identities of the one or more intermediary user devices of the system. The payment token may also be independent of a total number of the one or more intermediary user devices of the system. In the illustrative embodiments, the sending user device is unaware of the identities and total number of the one or more intermediary devices involved in forwarding the communication from the sending user device to the receiving user device. The communication may be delivered by a base station to a receiving user device of the system, for example, via a single-hop downlink path not involving any additional intermediary user device of the system, or via a multi-hop downlink path involving one or more additional intermediary user devices of the system.

A particular payment claim generated by a given intermediary user device may comprise an aggregation of multiple payment claims each associated with a different payment token. Such an aggregated payment claim advantageously requires substantially fewer bits of storage than its associated payment tokens. Thus, a given intermediary user device may aggregate a plurality of payment claims and periodically transmits said aggregated payment claims to a particular one of a plurality of base stations of the system. Each of the base stations forwards its received payment claims, and possibly additional information such as network statistics, to an accounting entity of the system. The accounting entity is operative to detect particular types of improper behavior by one or more of the user devices based on the payment claims and the network statistics.

In accordance with another aspect of the invention, the payment token may be of the form $$\mu = MAC_{K_{u_o}}(p, L),$$

where p is at least a portion of the communication, L is indicative of a payment level that would be available if a forwarding intermediary user device is entitled to a payment claim, MAC denotes a message authentication code, and $K_{u_o}$ is a secret key associated with the sending user device. A base station upon receipt of the communication from a given one of the intermediary devices determines the secret key $K_{u_o}$ of the sending user device, and then verifies that the payment token $$\mu = MAC_{K_{u_o}}(p, L).$$

If the verification fails, the base station drops the communication.

In accordance with yet another aspect of the invention, a given one of the intermediary devices upon forwarding the communication determines if the associated payment token entitles that intermediary device to a payment claim by applying a predetermined function to the payment token and a symmetric key associated with the given intermediary device. The predetermined function may be based, for example, on a Hamming distance between a payment token $\mu$ and a symmetric key $K_u$ associated with the given intermediary device. Numerous alternative functions may be used to determine if an intermediary device is entitled to a payment claim based on a given payment token associated with a communication.

The present invention in the illustrative embodiments overcomes the drawbacks associated with the conventional collaboration encouragement techniques described previously. In addition, such embodiments can be readily implemented in a lightweight user device.

DETAILED DESCRIPTION OF THE INVENTION

The invention will be illustrated herein in conjunction with exemplary communication systems comprising user devices, base stations, a backbone network and an accounting entity. It should be understood, however, that the invention is more generally applicable to any system in which it is desirable to implement a micro-payment scheme to facilitate the forwarding of packets or other communications from user to user within such a system. For example, the described techniques can be adapted in a straightforward manner to systems which include elements other than those of the illustrative embodiments described below.

Figure 1:
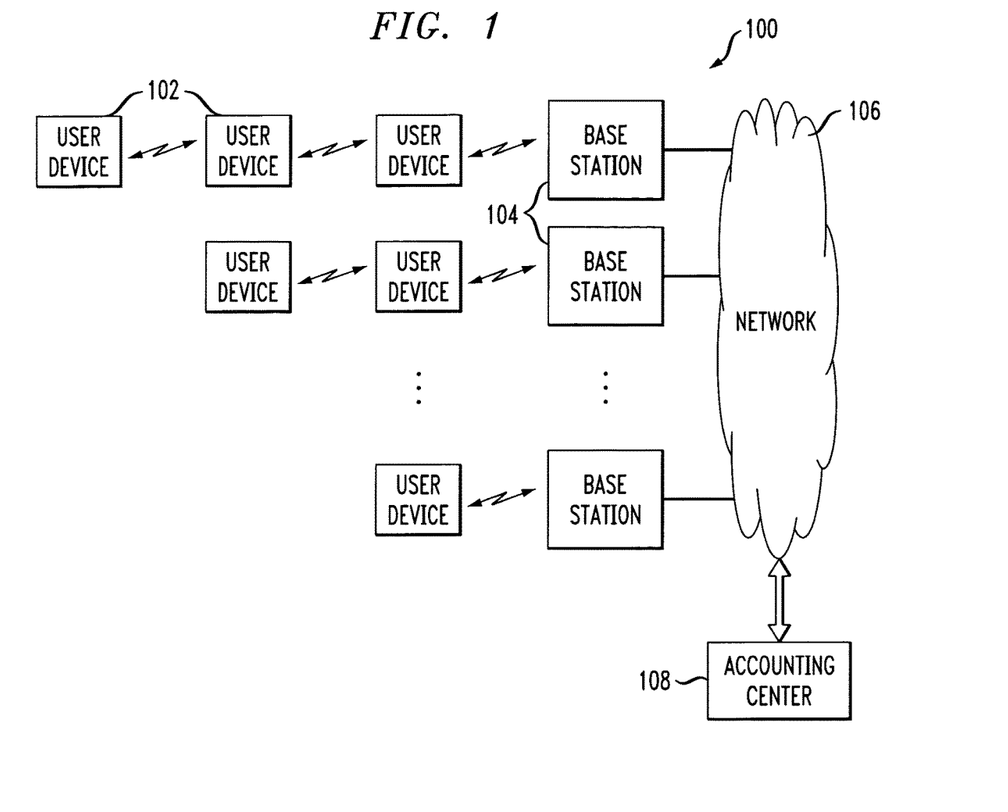
FIG. 1 shows an example of a communication system in which the present invention is implemented.

FIG. 1 shows an example of a communication system 100 in which the present invention is implemented. The system 100 comprises a plurality of user devices 102, a plurality of base stations 104 coupled to a network 106, and an accounting entity comprising an accounting center 108 also coupled to the network 106.

The user devices 102 may comprise mobile communication devices, such as mobile telephones, portable computers, personal digital assistants (PDAs), or other types of communication devices, that communicate with base stations 104 via wireless communication. For example, system 100 may comprise a third generation (3G) wireless cellular system such as the Universal Mobile Telecommunications System (UMTS). As another example, the system 100 may comprise a wireless local area network such as an IEEE 802.11 network. The base stations 104 may therefore be wireless cellular base stations of a 3G system, access points in an 802.11 system, or other types of base stations, as well as combinations of a variety of different types of base stations.

The term "base station" as used herein is therefore intended to include, without limitation, an access point of a wireless network. A "multi-hop cellular network" is intended to include, without limitation, a 2G or 3G mobile telephony system, a packet radio system, a wireless local area network system, or other type of system in which users communicate with an access point or other type of base station.

The present invention in the illustrative embodiments described herein provides a micro-payment scheme for multi-hop cellular networks, such as system 100 of FIG. 1, that encourages collaboration in packet forwarding by letting users benefit from relaying the packets of other users. These embodiments, while providing mechanisms for detecting and rewarding collaboration, also provide appropriate mechanisms for detecting and punishing various forms of abuse. The resulting approach, which is exceptionally lightweight in that it does not require significant computational or storage resources, makes collaboration rational and cheating undesirable.

In the illustrative embodiments, a given one of the user devices 102, which will be referred to herein as an originating user device or more generally a sending user device, generates a packet or other communication for forwarding to a given one of the base stations 104 via one or more intermediary user devices 102 of the system 100. The sending user device associates a payment token with the communication, such that at least a given one of the intermediary user devices can generate a payment claim based on the payment token. Any such payment claims may be transmitted by the intermediary devices to one or more of the base stations. As will be described in greater detail below, the payment token is independent of the identities of the one or more intermediary user devices of the system. That is, the payment token does not identify or otherwise make reference to any particular intermediary user devices of the system. The payment token may also be independent of the total number of the one or more intermediary user devices of the system. Thus, in the illustrative embodiments, the sending user device is unaware of the identities and total number of the intermediary devices involved in forwarding the communication from the sending user device to the base station.

The term "ticket" as used herein may be viewed as an example of what is more generally referred to as a payment token.

The term "forwarding" as used herein is intended to be construed broadly so as to encompass a wide variety of different types of retransmission. For example, a given communication can be forwarded from one system node to another at any of a number of different levels of a given communication protocol stack. The invention does not require any particular type of forwarding, and is not intended to be restricted in this regard.

The one or more intermediary user devices may comprise a plurality of intermediary user devices in a multi-hop uplink path between the sending user device and the base station. The communication received via such an uplink path may be delivered by the base station to a receiving user device 102 of the system 100. For example, the communication may be delivered by the base station to the receiving user device via a single-hop downlink path not involving any additional intermediary user device of the system. Alternatively, the communication may be delivered by the base station to the receiving user device via a multi-hop downlink path involving one or more additional intermediary user devices of the system.

In alternative embodiments, a given communication may be forwarded from a sending user device to a receiving user device via one or more intermediary devices without passing through a base station. In such an arrangement, the base station may still serve to process other information from one or more of the devices, such as, for example, aggregated payment claims and network statistics.

The one or more intermediary user devices can each transmit a payment claim based on the payment token to one of the base stations 104 of the system, for example, to a nearest base station of the system. Each of the base stations then forwards its received payment claims to an accounting entity, such as accounting center 108. Typically, a given one of the user devices 102 aggregates a plurality of payment claims and periodically transmits its aggregated payment claims to a particular one of the base stations 104 of the system. Thus, a particular payment claim submitted to a base station may comprise an aggregation of multiple claims each associated with a different payment token. Such an aggregated payment claim may be advantageously configured so as to require substantially fewer bits of storage than its associated payment tokens. As will be described elsewhere herein, probabilistic methods for aggregation may be used to compress multiple payment tokens into a single aggregated payment claim. The base stations may also forward, to the accounting center, network statistics relating to packet transmission. The accounting center is operative to detect misbehavior by one or more of the user devices based on the payment claims and the network statistics.

These aspects of the invention will be described in greater detail below, with reference to the particular embodiments shown in FIGS. 3 and 4.

It is to be appreciated that, although only a relatively small number of user devices and base stations are shown in FIG. 1 for clarity and simplicity of illustration, practical implementations of the system 100 will typically support substantially larger numbers of such elements. The invention is therefore not restricted as to the particular number of user devices, base stations, accounting entities or other elements, nor does the invention require any particular arrangement of such elements within a given system.

As indicated previously, a given user device 102 may represent a lightweight device, such as a mobile telephone, PDA, game console, etc. The client 102 may alternatively represent a desktop or laptop personal computer (PC), a microcomputer, a workstation, a mainframe computer, a wired telephone, a facsimile machine, a television set top box, or any other information processing device which can benefit from the micro-payment techniques of the invention.

A given user device 102 may also be referred to herein as a user. The term "user" should be understood to encompass either a user device, a person utilizing or otherwise associated with the user device, or both. An operation described herein as being performed by a user may therefore be performed by a device, a person utilizing or otherwise associated with the device, or by both the user and the device.

The network 106 may represent a global computer network such as the Internet, a wide area network (WAN), a local area network (LAN), a satellite network, a telephone or cable network, or various portions or combinations of these and other types of networks.

The accounting center 108 may be implemented as one or more otherwise conventional servers or other processing elements programmed to perform the accounting and auditing functions associated with the micro-payment scheme of the illustrative embodiments. Although shown as separate from the base stations in this embodiment, the accounting entity in other embodiments may be incorporated into one of the base stations, or distributed across multiple base stations or other system elements. The accounting center 108 may comprise or be otherwise associated with a bank or other financial institution.

Figure 2:
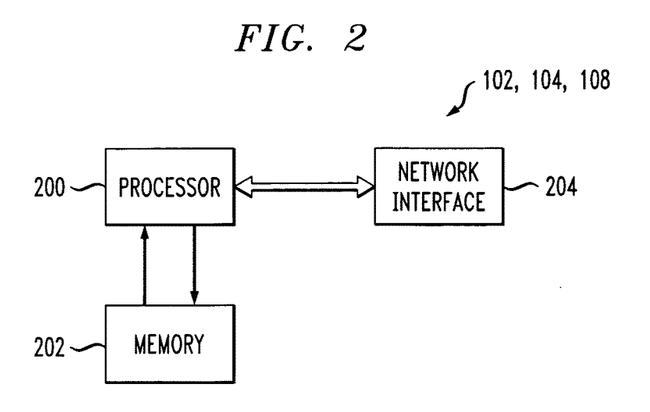
FIG. 2 is a simplified block diagram of a processing element of the FIG. 1 system.

FIG. 2 shows one possible implementation of a given processing element of the system 100. Such a processing element may comprise a particular one of the user devices 102, base stations 104, or accounting center 108. The processing element in this implementation includes a processor 200 coupled to a memory 202 and a network interface 204. These components may be implemented in whole or in part as a conventional microprocessor, digital signal processor, application-specific integrated circuit (ASIC) or other type of circuitry, as well as portions or combinations of such circuitry.

As will be appreciated by those skilled in the art, a micro-payment scheme in accordance with the present invention can be implemented at least in part in the form of one or more software programs that are stored in device memory 202 and executed by the corresponding processor 200. The memory 202 may also be used for storing information used to perform computations or other operations associated with implementation of a micro-payment scheme in the illustrative embodiments of the invention.

Figure 3:
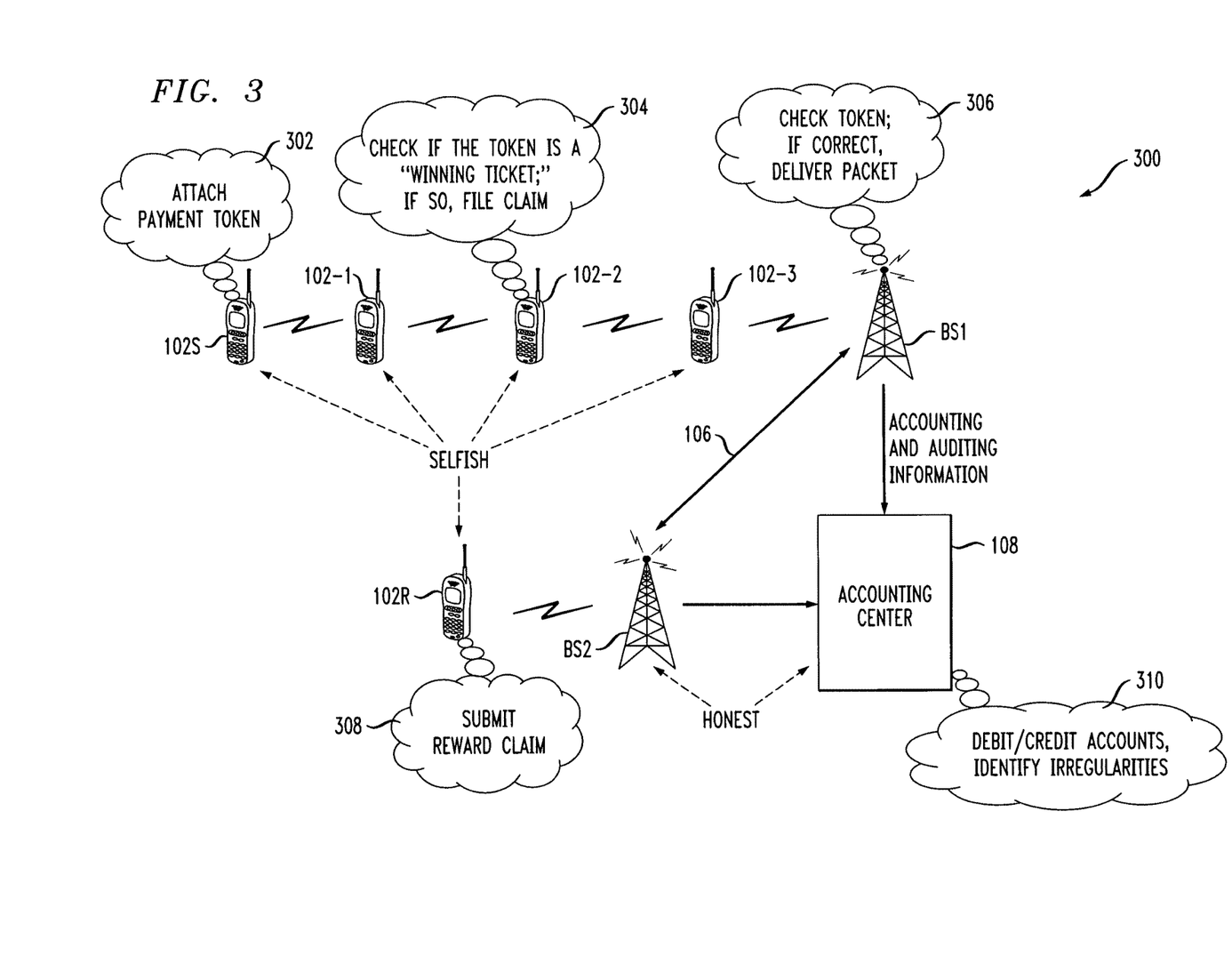
FIGS. 3 and 4 show illustrative embodiments of a micro-payment scheme of the present invention as implemented in the FIG. 1 system.

Referring now to FIG. 3, a system 300 representing a particular illustrative configuration of the general FIG. 1 system is shown. The system 300 includes base stations BS1 and BS2 which communicate with one another and with accounting center 108 over a network 106. The network 106 may be viewed as a "backbone network." The system 300 further includes a plurality of user devices 102, including a sending user device 102S, a receiving user device 102R, and intermediary user devices 102-1, 102-2 and 102-3.

In operation, the sending user device 102S generates a packet for forwarding to base station BS1. The sending user device 102S does not know the identities of the particular user devices, nor the total number of such devices, which will serve as intermediaries in the uplink path of the packet to BS1. However, as shown, these intermediary devices in this example include the three devices 102-1, 102-2 and 102-3. The base station BS1 receives the forwarded packet, and if appropriate forwards it over network 106 to base station BS2, which delivers the packet directly to the receiving user device 102R. This is an example of an asymmetric multi-hop network connection, since there are multiple hops on the uplink, and only a single hop on the downlink. As will be described below in conjunction with FIG. 4, the invention can also be implemented in symmetric multi-hop network connections, in which both the uplink path and the downlink path include multiple hops. Other configurations are possible, such as an asymmetric multi-hop network connection with a single hop on the uplink and multiple hops on the downlink.

The user devices 102 in this example are generally referred to as selfish devices, in that their associated users act in a rational but selfish manner. In contrast, the base stations BS1, BS2 and the accounting center 108 are honest or trusted parties.

In accordance with an aspect of the invention, the sending user device 102S associates a payment token with the packet. More specifically, in this example the payment token is attached to the packet, as indicated in step 302. The payment token is independent of the identities of the one or more intermediary user devices 102-1, 102-2 and 102-3, and in this embodiment is also independent of the total number of the one or more intermediary user devices of the system. As indicated above, the sending user device does not know how many or which devices of the system will serve as intermediary devices for the forwarded packet.

Each of the intermediary devices 102-1, 102-2 and 102-3 utilizes the payment token to generate a payment claim, also referred to herein as a reward claim, which it transmits to BS1 or another base station of the system. The payment token may be viewed as a type of lottery ticket, and the intermediary device applies certain processing operations to be described elsewhere herein in order to determine if the token is a "winning ticket," that is, a token that entitles the intermediary device to a payment claim upon forwarding the packet. If the token is determined to be a winning ticket, the intermediary device generates a payment claim, and transmits or "files" it in an appropriate manner. Step 304 illustrates this process for a given one of the intermediary devices, namely, the second intermediary device 102-2. Eventually, any such claims generated by the intermediary devices are presented, typically via one or more of the base stations, to the accounting center for processing in a manner to be described in greater detail below.

The base station BS1 upon receiving the forwarded packet and attached token from the intermediary user device 102-3 checks the token for correctness, and if the token is correct, delivers the packet over the network 106 to the base station BS2 associated with the receiving user device 102R. This process is illustrated in step 306 of the figure.

As indicated in step 308, the receiving user device 102R may also generate and submit a claim to the base station BS2. However, this is not a requirement. Such claim generation by a receiving user device is generally of greater use in a subsequent accounting and auditing process if there is a multi-hop downlink path, an example of which will be described below in conjunction with FIG. 4.

Accounting and auditing information, such as the claims generated by the intermediary devices, is delivered by the base stations BS1 and BS2, and possibly other base stations of the system, to the accounting center 108 for processing. As indicated in step 310, this processing may include, by way of example, debiting or crediting of user accounts, and identification of irregularities that may indicate the presence of cheaters in the system. More detailed examples of an accounting and auditing process suitable for use in the system 300 will be described in a separate accounting and auditing section below.

As noted above, the invention can be implemented using single-hop or multi-hop downlink paths. These two cases are illustrated in the example system 400 of FIG. 4, which may be viewed as another possible implementation of the more general system of FIG. 1. In the system 400, there is a single sending user device 102S, which generates a packet for forwarding by an indeterminate number of intermediary nodes to a base station BS1 as shown. As in the previous example, the base station BS1 communicates over network 106 with base station BS2. The base station BS2 is associated with two different receiving user devices, namely, a first receiving user device 102R1 which in a first case receives the packet from BS2 via a single-hop downlink path, and a second receiving user device 102R2 which in a second case receives the packet from BS2 via a multi-hop downlink path having an indeterminate number of intermediary nodes. The two cases may represent independent instances of operation of the FIG. 4 system, or both may occur substantially simultaneously in a given instance of operation.

Figure 4:
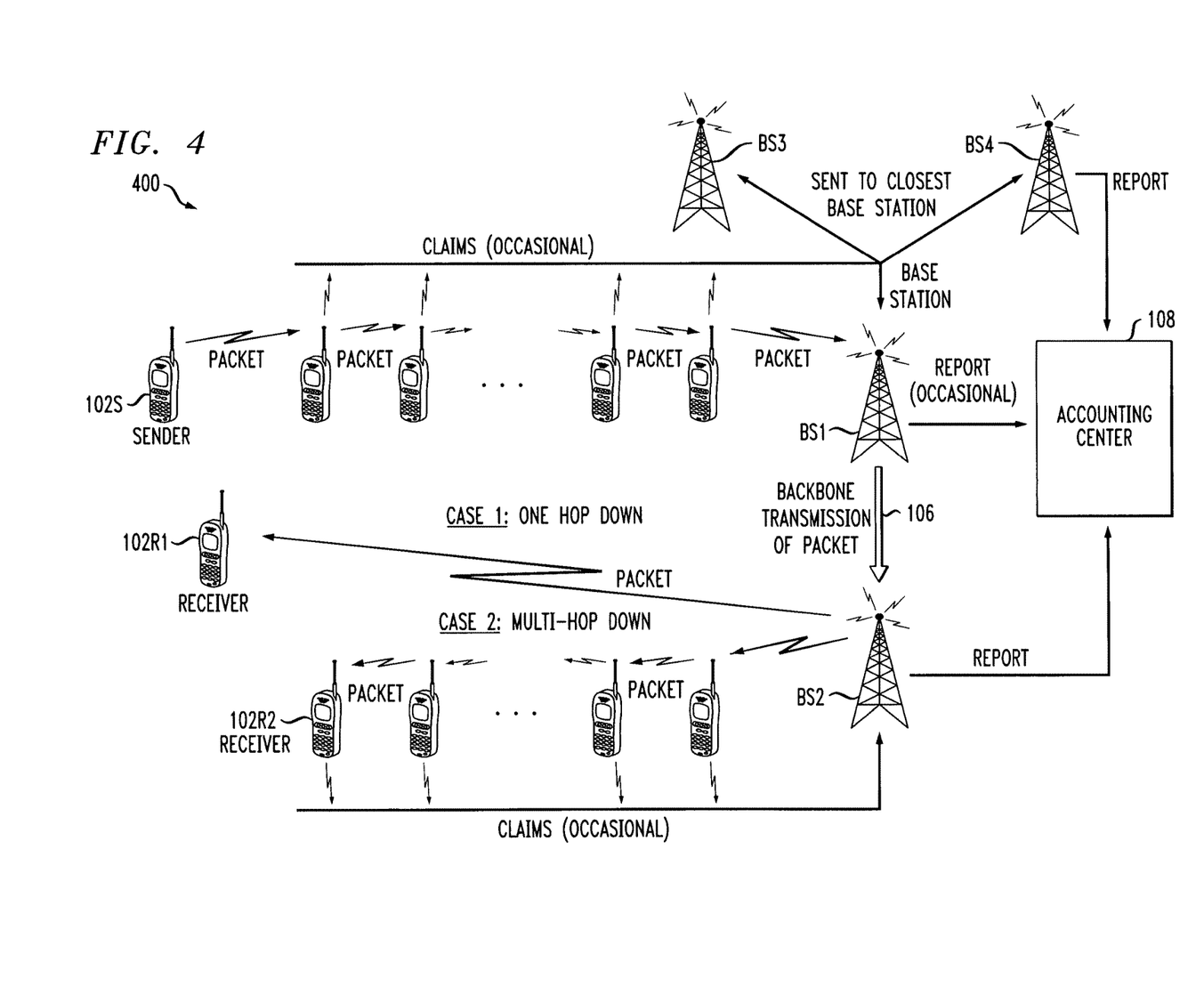

As shown in FIG. 4, claims generated by the intermediary devices are transmitted on a periodic or otherwise "occasional" basis to associated base stations, which may include base station BS1, as well as other system base stations, such as base stations BS3 and BS4 as shown. Similarly, claims generated by the intermediary devices on the multi-hop downlink path are transmitted on an occasional basis to associated base stations, such as base station BS2. Claims received by the base stations BS1, BS2, BS3 and BS4, as well as others, are reported, also on a periodic or otherwise occasional basis, to the accounting center 108 for further processing in the manner described elsewhere herein.

Although not explicitly shown in the figure, the single-hop downlink path receiving user device 102R1 may, but need not, generate a claim which, like the claims generated by other user devices, is sent to a closest base station. Generally, the receiving user device 102R2 will generate such a claim, since in the multi-hop downlink path case such a claim provides information that is useful in the accounting and auditing process.

It is to be appreciated that the particular system and communication path configurations shown in FIGS. 3 and 4 are presented by way of illustrative example only, and should not be construed as limiting the invention to such configurations. Those skilled in the art will recognize that the techniques described herein are readily applicable to numerous alternative configurations involving single-hop or multi-hop uplink and downlink paths.

The illustrative embodiments implement a particular micro-payment scheme for encouraging the intermediary devices to cooperate in forwarding packets or other communications on behalf of sending user devices. An example protocol implementing such a scheme, and an associated system model involving a multi-hop uplink and a single-hop downlink, will be described in detail in separate sections below.

Micro-payments are potential tools for fostering collaboration among rational but selfish participants, and may be used to encourage collaborative routing of packets or other communications. However, while conceptually well suited to such a task, conventional micro-payment schemes generally cannot be applied as such to the multi-hop cellular context. One reason is that it is unlikely in the multi-hop cellular context for a given packet originator to know what parties, or even how many parties, are on the route of the packet. In contrast, conventional micro-payment schemes assume that the payer knows, at the very least, how many payments are required, as well as the identities of the payees, by identifier, pseudonym, address or other identifying information.

As in conventional micro-payment schemes, the payment token received by a given intermediary user device may be thought of as a lottery ticket. Upon receiving it, the payee can determine whether it is a winning ticket or not, allowing him to erase tickets that were not winning, and request payments from the accounting center for those that were. Also as in conventional techniques, the accounting center may transferring funds between payers and payees in a "zero-sum" manner, meaning that for each payee that gets credited, the corresponding charge is levied upon the payer.

In the illustrative embodiments, instead of using one payment token per payee as in conventional micro-payment schemes, we use one payment token per packet, letting all relaying nodes verify whether this token corresponds to a winning ticket for them. To avoid forged deposits, the packet originator needs a secret key to produce the token, in a manner similar to other micro-payment schemes. To discourage colluders from collecting payments for each other, we utilize the secret key of the intermediary to verify whether a ticket wins. Thus, mutually suspicious colluders will not give each other their secret keys, as this allows the others to request service billed to the key owner.

Therefore, we describe herein a system in which all packet originators attach a payment token to each packet, and all intermediaries on the path of the packet to a base station verify whether this token corresponds to a winning ticket. Winning tickets are reported in the form of payment claims to nearby base stations at regular intervals. The base stations, therefore, receive both payment claims, which are forwarded to the accounting center 108, and packets with payment tokens. After verifying the validity of the payment tokens, base stations send the packets, now without their corresponding payment tokens, to their desired destinations, over the backbone network. The base stations also send the payment tokens, or some fraction of these, and potentially in batches, to the accounting center. Packets with invalid tokens are dropped, as the transmission of these cannot be charged to anybody.

However, and again in contrast to previous micro-payment proposals, intermediaries are made to profit not only from their own winning tickets, but also from those of their neighbors. In the illustrative embodiments, all payment claims are accompanied by the identities of the two neighboring parties on the packet path. This has three direct benefits: First, the "neighbor reward" encourages the transmission of the packet, while the "personal reward" can be seen as a reward for receiving the packet and for reporting this fact to the clearing house. Second, it increases the number of rewards per deposited ticket, which in turn means that fewer tickets need be deposited. Third, and more importantly, it allows for the compilation of packet forwarding statistics that can be used to detect inconsistent or other cheating behavior of intermediaries. By comparing the relative amounts of "neighbor rewards" and "personal rewards" on a per-node basis, the accounting center can detect various forms of abuse. In particular, this analysis will identify parties that routinely drop packets, and parties that refuse to handle packets without winning tickets. It will also detect various forms of collusion.

As previously mentioned, we discourage users from performing "collaborative ticket checking" by requiring that they know each other's keys for this to be possible. In addition, our auditing techniques allow for detection of such behavior, thereby providing two independent layers of protection. While the auditing techniques only detect repeated misbehavior, as opposed to the very occasional abuse, this is sufficient for practical applications, as very few people are likely to alter their devices to make a few cents a month. On the other hand, the more aggressively somebody abuses the system, the faster they will be apprehended, and appropriately punished.

Thus, payers are charged per packet, and not per winning ticket, while users performing packet forwarding are paid per winning ticket. Such asymmetric payment schemes often allow a coalition of malicious users to make a net profit. As we will show below, the illustrative embodiments are immune against this kind of abuse.

As noted above, an example system model involving a multi-hop uplink and a single-hop downlink, and an associated protocol for implementing a micro-payment scheme in accordance with the invention, will now be described in the respective separate sections that follow. In a third section, an example accounting and auditing process suitable for use with the system model and protocol will be described in detail. It should be appreciated, however, that the example system model, protocol and accounting and auditing process presented below do not represent requirements of the invention, but are merely illustrative of the inventive techniques. Those skilled in the art will recognize that numerous alternative system models, protocols, and accounting and auditing processes may be used in implementing the invention.

System Model

User Model. We assume the existence of three types of participants: users, base stations, and one or more accounting centers. In addition, there may be multiple networks, each one of which is considered the home network for some users. We distinguish between base stations of the home network, and those of other networks, as will be explained below. We also assume that there is one accounting center per network.

Mobile devices usually have very limited storage and power resources. The base stations and the accounting center, on the other hand, may correspond to powerful computers that are connected to each other by means of a high bit rate backbone network.

Communication Model. We assume the use of a network with a multiple-hop uplink, and a one-hop downlink, noting that this choice minimizes the global energy consumption of all mobile devices. We call a network of this kind an "asymmetric multi-hop cellular network." In other words, as a packet travels from its originator to the closest base station, it is transmitted in multiple short hops, since this minimizes transmission costs. Here, the receiving base station may belong to the home network of the user, or, if the user is roaming, to another network, called the foreign network. Then, the packet is sent over the backbone from the base station receiving the packet, to the base station closest to the message recipient. If the packet is multicast, there may be several such base stations, and corresponding receivers. The closest base station, in turn, transmits it directly (i.e., in one hop) to the recipients. This does not require any involvement (or energy consumption) by any of the mobile devices in range. Note that the energy expenditures of the receiver are independent of the distance of the transmission: it is only the sender whose energy consumption depends on this distance. This model is therefore different from the commonly used symmetric communication model in which cell phones and base stations communicate without intermediaries (i.e., where both uplink and downlink are one-hop).

This model is also different from the one usually considered for multi-hop cellular networks. Indeed, in the proposals published so far, both the uplink and the downlink connections are multi-hop. These properties are strongly influenced by the traditional approach of cellular networks (e.g., GSM) and wireless LANs (e.g., IEEE 802.11), in which all links are assumed to be bidirectional. This bidirectionality is considered to be very important, notably for radio resource allocation, power control, and synchronization.

The reason why we depart from this assumption is that a single-hop downlink can be highly beneficial. Indeed, as there is no need to relay downlink signals, the transmission power for the downlink is provided exclusively by the base station, sparing the batteries of the nodes which otherwise would have had to relay the packet. Moreover, this direct channel can be exploited to transmit synchronization signals from the base station to all mobile devices present in the cell. Finally, it makes the allocation of the radio resource on the downlink easier to implement.

Functional Model. Users can be categorized as belonging to one or more of the following classes: originators; recipients; and intermediaries. An originator of a packet wishes to have this sent to one or more recipients of his choice. Intermediaries may act as routers, forwarding such packets towards the closest base station. Each such packet then gets transmitted through the backbone network to the base station(s) corresponding to the recipient(s); here they get broadcast by the base station in question and received by the desired recipient. Note again that a packet is only handled by intermediaries on its way to a base station, and not from a base station on its way to its recipient.

Trust Model. Although in reality, very few consumers would attempt to modify the functionality of their devices, it is sufficient that a small fraction would abuse the protocol in order for its commercial usefulness to be endangered. Reflecting this, we make the pessimistic assumption that the devices can be straightforwardly modified by their owners, corresponding to modeling the user as a software module run on a multi-purpose computer, with an appropriate communication module. Users are not trusted to act according to the protocol, but rather, may deviate from this in any arbitrary way. However, it is assumed that the users act rationally, i.e., that they only deviate from the protocol when they can benefit from doing so. In particular, users could collude in an arbitrary fashion, and could use a strategy that is a function of data they receive by means of the network. Users trust base stations of their home network not to disclose their secret keys; no such trust has to be placed in base stations outside their home network. All base stations are trusted to correctly transmit packets, and to forward billing and auditing information to the accounting center of the user's home network, according to the protocol. The accounting center, in turn, is trusted to correctly perform billing and auditing. These are reasonable assumptions for a network that is well guarded against compromise: it is also a reasonable assumption in a network comprising a small number of principals that audit each other's activities, for example, by cryptographic and/or statistical means, or other means.

Goals. The end goal of our protocol is to maximize battery life by minimizing the required transmission signal strength of mobile devices, with the added benefit of increasing the available bandwidth by reducing signal strength. In order to reach this goal, given the selfish nature of users, we propose a set of mechanisms for encouraging collaboration and detecting (and punishing) cheating. In particular, these mechanisms are designed to address several types of abuse, as described hereafter.

Abuse. A naive solution to the problem may simply provide users with a strategy that maximizes the common good by requiring individual users to collaborate by forwarding other users' packets. However, users—being selfish—may deviate from this proposed protocol. In order to reward altruism, our protocol aims to detect collaboration, allowing this to be rewarded—whether in monetary terms or in terms of improved service levels. Furthermore, our protocol has mechanisms for detection of various forms of cheating. In particular, we prevent or detect the following types of abuse, whether these strategies are used in a "pure-bred" form, or in combination with each other:

1. Selective acceptance. A cheating strategy in which a user agrees to receive (with the intent to re-transmit) packets with winning tickets, but not packets without winning tickets. A variation of the attack is when a first user sends a packet to a friend to route, given that the packet is likely to contain a winning ticket for the friend.

2. Packet dropping. When a user agrees to receive packets, but does not re-transmit them—whether he claims credit for winning tickets or not.

3. Ticket sniffing. When a user claims credit for packets he intercepted, but neither agreed to retransmit nor actually re-transmitted. In a severe version of this attach, colluding users along a fake path submit claims as if they routed the packet.

4. Crediting a friend. When a user with a winning ticket claims to have received the packet from (or have sent it to) a party different from that which he in actuality did receive it from (resp. sent it to.)

5. Greedy ticket collection. This is a collection of cheating strategies aimed towards allowing users to claim credits in excess of what the protocol specifies, by collecting and sharing tickets with Colluders. Three special cases of this general attack are (1) when one user collects tickets for a friend, knowing that these are likely to be winning tickets for the friend; (2) when sets of users collect and pool tickets, allowing each other to sift through a larger pool than they routed; and (3) when a user obtains two or more identities, evaluating tickets with all of these to increase the chances of winning.

6. Tampering with claims. An attack in which a cheater modifies or drops the reward claim filed by somebody else—when routed via the cheater—with the goal of either increasing his profits or removing harmful auditing information.

7. Reward level tampering. An attack in which a packet carries an "exaggerated" reward level promise during some portion of its route, but where the reward level indicator is reduced before it is transmitted to the base station.

Note, however, that a plain refusal to collaborate is not abuse; as long as the refusal is independent of whether a packet carries a winning ticket or not. Users may choose not to route other users' packets if their resources or policies do not permit them to do so.

Moreover, note that we do not address "circular routing" as a possible attack, given that the rewards will be deterministic given a particular ticket, and therefore, such routing does not behoove an attacker. Neither do we consider the milder form of abuse where a set of users route a message along an unnecessarily long path within a particular neighborhood, in order to allow all of them to justifiably) claim credit for having handled the packet. This assumption is reasonable if there is enough "real traffic" to route, and the reward structure is set appropriately.

Protocol

Setup. As a user u registers to be allowed access to the home network, he is assigned an identity $id_u$ and a symmetric key $K_u$. This pair is stored by the user and by the user's home network. As is common, users offer their service provider some form of security, normally implemented by means of a contract or deposit.

Rewards. Originators may indicate one of several reward levels; the ultimate (billing) cost for these levels may be specified by service agreement. The reward level L is an integer within a pre-specified interval [0 . . . $max_L$]. Intermediaries are rewarded accordingly: if transmitting a packet associated with a higher reward level, their expected reward will be greater (with reimbursement levels specified by their service contract). Increasing the reward level allows users with particularly low battery resources to obtain service in a neighborhood populated by other users with low battery resources.

Connectivity Graph. We assume that each user u keeps a list $\lambda_u$ of triples $(u_i, d_i, L_i)$, where $u_i$ is the (unique) identity of a neighbor with a path of length $d_i$ hops to the closest base station. We do not address how the routing table is built, noting that any standard method, whether proactive or reactive, may be employed. In addition to standard information, the users also exchange information about their reward thresholds $L_i$. Furthermore, $L_i$ is user $u_i$'s corresponding threshold for forwarding packets. Thus, an entry $(u_i, d_i, L_i)$ in $\lambda_u$ means that user $u_i$ will forward all packets whose reward level is equal to or greater than $L_i$, and that the length of the path from $u_i$ to the base station is $d_i$. We assume that $\lambda_u$ is sorted in terms of increasing values of $d_i$, and that all entries with the same distance $d_i$ are sorted in terms of increasing values of $L_i$.

Packet Origination. The originator $u_o$ of a packet p selects a reward level $L \in [0 \ldots max_L]$, and computes a message authentication code $$\mu = MAC_{K_{u_o}}(p, L).$$

The originator then assembles the tuple $(L, p, u_o, \mu)$ and transmits this according to the transmission protocol below.

Packet Transmission. Let u be a user (whether originator or intermediary) who wishes to transmit a packet associated with a tuple $P=(L, p, u_o, \mu)$. In order to transmit P, user u performs the following protocol:

1. If the base station can be reached in a single hop, then u is allowed to send the packet directly to it; otherwise he goes to step 2.

2. u selects the first (hitherto unselected) entry $(u_i, d_i, L_i)$ from $\lambda_u$ for which $L_i \leq L$.

3. u sends a forward request to $u_i$. This contains the reward level L and possibly further information about the packet p, such as its size (most protocols support several packet sizes).

4. u waits for an acknowledgment from $u_i$ for some pre-set time period δ. If u receives the acknowledgment, then he sends P to $u_i$. Otherwise, if no acknowledgment arrives, he increases i by one. If $i > |\lambda_u|$ then he drops the packet; otherwise, he goes to step 2.

5. If u is not the originator of the packet, he performs the reward recording protocol below.

Packet Acceptance. Let u' be a user receiving a forward request from u with reward level L. If L is less than his threshold, then he does not accept the request; otherwise, he accepts it by sending an acknowledgment to u and awaits the transmission of the packet.

Network Processing. When a tuple $P=(L, p, u_o, \mu)$ is received by a base station in the originator's home network, the base station looks up the secret key $K_{u_o}$ of the originator $u_o$ and verifies that $$\mu = MAC_{K_{u_o}}(p, L),$$

dropping the packet if this does not hold.

If the packet is received by a base station that belongs to a foreign network, this base station cannot perform the verification (as it does not have access to the originator's secret key), and so, forwards the tuple P to a register in the originator's home network. This register, then, looks up the originator's secret key, performs the verification, and drops the packet if the verification fails. Similarly to the technique adopted in most 2G and 3G cellular networks, the detour of each and every packet via the home network can be avoided, by letting the foreign network perform the described verifications; this can be done without revealing the secret key to the foreign network.

If the verification of the MAC succeeds, the base station (resp. home network register) transmits the packet p to the base station associated with the desired recipient (as indicated in p). The base station associated with the desired recipient broadcasts p to the latter. Standard techniques can be used to determine in what cells packet recipients are located. In particular, one may require users to announce their location to base stations at regular intervals, or to announce changes of location—inferred by these by the changing identity of the closest base station. While this "announcement" is currently performed by direct communication from mobile device to base station, our multi-hop technique can obviously be used instead. Users may piggyback reward claims with such location announcements.

The first base station records a fraction $\varepsilon_\mu$ of all triples ($\mu$, L, u), where u is the identity of the user it received the packet from. It also keeps a count $cnt_{u_o}$ of the number of packets it transmits for $u_o$. Periodically, base stations send such recorded auditing information to an accounting center, along with geographical information consisting of statistics of what users were in what cell at what time (not all such information is sent, but some portion). Other types of network statistics may be used.

Reward Recording. After user u has forwarded a tuple P=(L, p, $u_o$, $\mu$), he verifies whether $f(\mu, K_u)=1$ for some function $f$ (the choice of which is discussed below). If this relationship holds, it means that the considered ticket is winning; he then records ($u_1$, $u_2$, $\mu$, L), where $u_1$ is the identity of the user he received the associated packet from, and $u_2$ is the identity of the user (or base station) he forwarded it to. We let M denote the list of recorded reward triples.

Reward claim. If a user u is adjacent to a base station (i.e., the distance to the base station is one hop), then he transmits a claim (u, M, m) to the base station, where $m=MAC_{K_u}$(hash(M)). Thus, the reward claim M is authenticated using the same key $K_u$ as the user employs when originating a packet, or verifying whether a packet contains a winning ticket.

Similarly, if user u originates a tuple P or is running out of storage space for claims, then he transmits the claim to the closest base station by means of the packet origination protocol, and using the base station as the packet recipient. The portion M may be encrypted using a stream cipher and using a secret key shared by user u and either the base stations or the accounting center—in the latter case, the MAC m would be computed on the ciphertext of M.

When a base station receives a claim, it verifies the correctness of the MAC m with respect to the user u and the claim M (or the ciphertext, as explained above). If this is not correct, then it ignores the claim; otherwise, it records the claim and computes an acknowledgment ack to it as ack=$MAC_{K_u}$(m), where $K_u$ is the key it shares with the user (claimant) u. The acknowledgment ack is transmitted to u, who upon receipt verifies the acknowledgment and erases M if correct. Within a time $\Delta$, each base station forwards all recorded claims to an accounting center, and then erases the list.

Ticket Evaluations. As mentioned above, all tickets u are evaluated with respect to the secret key $K_u$ of the user u in question, and with respect to some public function $f$ that results in a uniform distribution of winning tickets. It is important that all of (or close to all of) $K_u$ is needed to evaluate $f$ successfully—or users would be able to verify reward claims on behalf of each other, without having to trust each other with their secret keys. One can choose $f$ as a one-way function, such as a hash function, and let a winning ticket be one that hashes to a value with a certain pattern (e.g., any string that starts with ten zeroes.) However, since the evaluation of $f$ has to be performed once for each packet the user u handles (except for those packets originating with u, of course), it is important that $f$ is lightweight, and preferably more lightweight than hash functions are.

One possibility is to let $f(\mu, K_u)=1$ if the Hamming distance between $\mu$ and $K_u$ is less than or equal to some threshold h. Thus, assuming that $|\mu|=|K_u|$, and given a particular reporting threshold h, the probability of $\mu$ being a winning ticket is $$\frac{1}{2^l} \sum_{i=0}^{h} \binom{l}{i}$$

where $l=|\mu|=|K_u|$. Note that it is possible to assign different rewards to different Hamming weights in the range, making it possible for a user to keep only the "highest rewards" in case he runs out of memory and needs to purge some portion of the rewards. However, for simplicity, we assume that all reward claims have the same value.

However, we note that if $f$ is not a one-way function (as in the case above) then it may be possible for an attacker to derive the user's secret key $K_u$ by observing what tickets are filed. Therefore, if such a function is used, it is important that all claims are encrypted during transmission, in which case only the number of claims (as opposed to the form of these) would be revealed to an attacker.

We note also that $f$ should be chosen in a way that the distribution of winning tickets is uniform.

It should be understood that the invention does not require the use of any particular function for determining if a given payment token corresponds to a winning ticket for a particular intermediary user device.

On the Probability of Winning. The efficiency of the example protocol described above relies on the probability of a winning ticket being small enough for the claim process not to dominate the protocol, whether in terms of storage or communication. At the same time, the probability should be large enough that the reimbursement process relies on a large number of claims, which in turn makes auditing possible by providing a sufficiently large data set. Therefore, one needs to carefully balance these problems against each other when selecting the appropriate reward function. Rather than a security issue, this corresponds to a risk management issue and a usability issue.

Accounting and Auditing

The accounting center in the illustrative embodiments receives both user claims and partial transmission transcripts, both typically forwarded by base stations. These are processed in the following manner.

Accounting. The accounting center periodically verifies all received user claims with respect to all recorded reward tuples it has received from base stations. All originators whose identity, $u_o$, has been recorded by a base station are charged a usage fee according to their service contract. Moreover, the accounting center credits all parties whose identity figures (whether as a claimant or neighbor thereof) in an accepted reward claim. There are two exceptions to this rule: Neither packet originators nor base stations obtain rewards. It is a policy issue how to set the rewards for neighbors to claimants, i.e., whether to let these depend on the reward level of the packet as well, and how large a neighbor reward would be in comparison to a claimant reward.

Here, a reward claim is said to be accepted if it is correct (i.e., if $f(\mu, K_u)=1$) and a base station has reported the packet associated to the ticket $\mu$ as having been transmitted. Note that the accounting center may credit claimants and neighbors thereof according to any policy, and, in particular, the amounts may differ between claimants and neighbors.

Simplified Auditing. Assume for a moment that the probability of a ticket to win is 1, and that all of these claims get reported by the users and passed on to the auditing center.

Assume further that all MAC headers are stored by the base stations, and forwarded to the auditing center. We can now see that the auditing center will know the origination point of each packet (from the identity and MAC of the packet), and the identity of the base station receiving it. It will also know the identity of the user transmitting it to the base station (since this is recorded by the latter). From the claim of this user, it will know the identity of the user one step earlier in the forwarding chain, and so on. This will take us all the way back to the identity of the user who received the packet from the originator, who in turn will report whom he received it from (i.e., the originator). If any user other than those already accounted for in the above claims a reward, this will be identified as an attempt to cheating. The auditing process for the probabilistic setting is analogous to the analysis of the simplified setting in that it approximates the latter by means of statistical methods.

Auditing. In the following, we will assume that $\varepsilon_\mu=1$, i.e., each base station stores the MAC header of each packet. The more general case in which different base stations store different fractions can be dealt with similarly: instead of merely counting occurrences, one would then test various hypotheses using standard statistical methods. It is worth noting that the probability of a ticket being a winning ticket is a function of three quantities: the message; the secret key of the originator; and the secret key of the intermediary (i.e., the party verifying whether the ticket is winning). Since the secret keys of users are selected uniformly at random, the distribution of winning tickets is uniformly distributed over all messages.

Common for many of the detection mechanisms is the observation that since the probability for a ticket to win is independent of the identity of the user, each user should figure as the claimant with approximately the same frequency as he figures as either the sending neighbor or receiving neighbor of a claimant. We note that this is true independently of what the "collaboration thresholds" of the different parties on the route are. This is so since we consider the frequencies along a path of senders where all have agreed to collaborate—their thresholds are therefore irrelevant. While one cannot simply compare the number of occurrences of these events, one can check the hypothesis that they are all generated from a source with the same event probability. As will become evident, many of the attacks we consider leave very similar-looking evidence, which may make it difficult to establish with certainty what the attack was. However, one can easily establish the presence of one of these attacks using standard statistical methods, and given sufficient material:

1. Selective acceptance. Selective acceptance is epitomized by a user figuring as a claimant with a significantly higher frequency than as a sending neighbor.

2. Packet dropping. A user is suspected of packet dropping if he has a higher claimant frequency than sending neighbor frequency for packets that were not reported as received by any base station.

3. Ticket sniffing. A user is suspected of ticket sniffing if he has a higher claimant frequency than sending neighbor or receiving neighbor frequency, and there are incidents when both he and a neighbor files a claim for one and the same ticket, but do not list each other as the corresponding neighbors. If an entire fake path of reward claims has been created, the auditing center can distinguish between this and a real path (with some probability) given that the receiving base station will record the identity of the user from whom the packet was received.

4. Crediting a friend. An indication of this attack is that the receiving neighbor of a given claim was reported by the base station to have been located in a distant cell at the time the packet was received by the base station. All cellular devices report to the closest base station when they move from one cell to another. Similarly, when a device is turned on, it reports to the closest base station. If a device is moved while turned off, we consider it to still remain in the cell where it last was heard from. Another indication is if a first user reports a second party to be the receiving neighbor, while another (also claiming a reward for the same packet) claims to have received the packet from the first party. While it is difficult to determine from one occurrence whether the first or the third party filed an incorrect claim, repeated occurrences will allow this to be established.

5. Greedy ticket collection. This has the same symptoms as the above mentioned attack. In addition, transmission paths—counted in number of claims per packet—that are longer than usual (for the given cell) are indicative of this attack. Similarly, abnormally high packet transmission rates per time unit by some user indicates that greedy ticket collection has taken place. Unusually large numbers of reward claims per time period therefore suggests that this has taken place. We note that the transmission rates must be placed in the context of what type of hardware is used. The hardware type is likely to be known by the service provider, so this does not cause any problem.

The greedy ticket collection attack is likely to be the hardest attack to detect; especially if users scan for tickets of packets sent within the same cell as they resided, and if the users take pains to make the reported neighbors consistent with each other. However, should one party be found guilty of this attack, this is likely evidence that its common neighbors are, too.

6. Tampering with claims. This attack is prevented by use of authentication techniques; the use of auditing tools does therefore not relate to the securing against it.

7. Reward level tampering. If claimants indicate higher reward thresholds than that used for a given packet, this is an indication that the originator and some colluder close to the base station may perform this attack. Repeated evidence from different claimants, all pointing towards one and the same originator, provides strong evidence of the attack, in turn.

As for credit card fraud, use patterns can be employed to guard against attacks; the above description is meant only as evidence that the collected audit information is sufficient to detect and trace misbehavior. Other techniques known in the art can be used. In fact, this problem is quite similar to intrusion detection, which has been studied for most existing and envisioned networks, including mobile ad hoc networks. See, for example, Y. Zhang et al. "Intrusion Detection in Wireless Ad-Hoc Networks," Proceedings of the Sixth ACM International Conference on Mobile Networking and Computing, Boston, August 2000 (Mobicom 2000).

Again, the particular techniques described in the foregoing system model, protocol and accounting and auditing process sections are presented by way of example only. For example, as noted previously, the invention can be implemented in symmetric multi-hop cellular networks. The above-described techniques can be adapted in a straightforward manner to these and other multi-hop communication contexts.

The illustrative embodiments provide an architecture for fostering collaboration between rational but selfish nodes of multi-hop cellular networks, and provide mechanisms to encourage honest behavior and to discourage dishonest behavior.

As indicated previously, another advantage of the illustrative embodiments is that such embodiments can be readily implemented in a lightweight user device, i.e., a device having limited processing power, memory or other computational resources. Such devices include, by way of example, mobile telephones, PDAs, game consoles, etc.

As indicated previously, other embodiments of the invention may involve a given communication being forwarded from a sending user device to a receiving user device via one or more intermediary devices without passing through a base station. Techniques such as those described above can be adapted in a straightforward manner for use in such an arrangement.

In other embodiments, the assumption that all packets have to go through a backbone network or other type of network 106 may be relaxed, for example, by combining the proposed solution with an approach related to pure ad hoc networks, such as the one proposed in the previously-cited reference L. Buttyan et al., "Stimulating Cooperation in Self-Organizing Mobile Ad Hoc Networks," ACM Journal for Mobile Networks (MONET), special issue on Mobile Ad Hoc Networks, October 2003, Vol. 8, No. 5.

Additional details regarding certain conventional cryptographic techniques suitable for use in conjunction with the present invention may be found in, e.g., A. J. Menezes et al., Handbook of Applied Cryptography, CRC Press, 1997, which is incorporated by reference herein.

The present invention may be implemented in the form of one or more integrated circuits. For example, a given system processing element as described herein may be implemented as one or more integrated circuits comprising at least one processor and at least one memory. Numerous other configurations are possible.

The present invention may also or alternatively be implemented at least in part in the form of one or more software programs that, within a given processing element, are stored in memory and run on a processor. Such processor and memory elements may comprise one or more integrated circuits.

It should again be emphasized that the particular micropayment techniques described above are provided by way of illustration, and should not be construed as limiting the present invention to any specific embodiment or group of embodiments. For example, as indicated above, the invention can be implemented using alternative system models, protocols, and accounting and auditing processes. Moreover, the various simplifying assumptions made above in the course of describing the illustrative embodiments should also be viewed as exemplary rather than as requirements or limitations of the invention. These and numerous other alternative embodiments within the scope of the following claims will be readily apparent to those skilled in the art.

What is claimed is:

1. A method for use in a communication system having a plurality of user devices configured to communicate with one or more base stations, the method comprising:
   generating in a sending user device of the system a communication for forwarding to a receiving user device of the system via one or more intermediary user devices of the system; and
   associating a payment token with the communication, such that at least one of the intermediary user devices can generate a payment claim based on the payment token;
   wherein the payment token is independent of identities of the one or more intermediary user devices of the system, in that the payment token does not identify or otherwise make reference to any of the one or more intermediary user devices;
   wherein the payment token comprises information identifying a payment that is obtainable by a given one of the intermediary user devices as its compensation for forwarding the communication to another user device;
   wherein the payment token is generated using a message authentication code function which takes as one of its inputs at least a portion of the communication and as another of its inputs information indicative of a payment level that would be available if a forwarding intermediary user device is entitled to a payment claim; and
   wherein the sending user device comprises a processor coupled to a memory, and the generating and associating steps are carried out under control of the processor.

2. The method of claim 1 wherein the communication comprises a packet.

3. The method of claim 1 wherein the payment token is independent of a total number of the one or more intermediary user devices of the system.

4. The method of claim 1 wherein the sending user device is unaware of the identities and total number of the one or more intermediary user devices involved in forwarding the communication from the sending user device to the receiving user device.

5. The method of claim 1 wherein the payment token is given by $$\mu = MAC_{K_{u_o}}(p, L),$$

where p denotes said at least a portion of the communication, L denotes said information indicative of a payment level that would be available if a forwarding intermediary user device is entitled to a payment claim, MAC denotes said message authentication code function, and $K_{u_o}$ is a secret key associated with the sending user device.

6. The method of claim 1 further comprising the sending user device maintaining a connectivity graph comprising a list $\lambda_u$ of triples $(u_i, d_i, L_i)$, where $u_i$ is an identity of a given one of the intermediary user devices with a path of length $d_i$ hops to a closest base station, and where $L_i$ is a reward threshold of the given intermediary device for forwarding packets.

7. The method of claim 6 wherein the list $\lambda_u$ of triples $(u_i, d_i, L_i)$ is sorted in terms of increasing values of $d_i$ with entries having a same value of $d_i$ sorted in terms of increasing values of $L_i$.

8. The method of claim 7 wherein the communication comprises a packet p, and further comprising:
   the sending user device selecting a reward level L for the packet p, the reward level L comprising said information indicative of a payment level that would be available if a forwarding intermediary user device is entitled to a payment claim; and
   the sending user device computing $$\Phi = MAC_{K_{u_o}}(p, L),$$

where MAC denotes said message authentication code function and $K_{u_o}$ is a secret key associated with the sending user device.

9. The method of claim 8 wherein associating the payment token with the communication comprises assembling a tuple $P=(L, p, u_o, \mu)$.

10. The method of claim 9 further comprising the sending user device selecting one of the intermediary devices for forwarding the communication to, wherein selecting the intermediary user device comprises:
(i) selecting a first entry from the list $\lambda_u$ of triples $(u_i, d_i, L_i)$ for which $L_i \leq L$;
(ii) sending a forwarding request to a given intermediary device having the identity $u_i$ in the selected first entry;
(iii) waiting a pre-set time period $\delta$ to receive an acknowledgement from the given intermediary device;
(iv) responsive to receiving the acknowledgement from the given intermediary device within the pre-set time period $\delta$, forwarding P to the given intermediary device; and
(v) responsive to not receiving the acknowledgment from the given intermediary device within the pre-set time period $\delta$, incrementing i by one and repeating (i)-(v).

11. A computer program product comprising a non-transitory processor-readable storage medium having stored therein program code of one or more software programs, wherein the program code when executed by at least one processing device causes said at least one processing device to perform a method comprising:
generating, in a sending user device of a communication system having a plurality of user devices configured to communicate with one or more base stations, a communication for forwarding to a receiving user device of the system via one or more intermediary user devices of the system; and
associating a payment token with the communication, such that at least one of the intermediary user devices can generate a payment claim based on the payment token;
wherein the payment token is independent of identities of the one or more intermediary user devices of the system, in that the payment token does not identify or otherwise make reference to any of the one or more intermediary user devices;
wherein the payment token comprises information identifying a payment that is obtainable by a given one of the intermediary user devices as its compensation for forwarding the communication to another user device; and
wherein the payment token is generated using a message authentication code function which takes as one of its inputs at least a portion of the communication and as another of its inputs information indicative of a payment level that would be available if a forwarding intermediary user device is entitled to a payment claim.

12. The computer program product of claim 11 wherein the communication comprises a packet.

13. The computer program product of claim 11 wherein the payment token is independent of a total number of the one or more intermediary user devices of the system.

14. The computer program product of claim 11 wherein the sending user device is unaware of the identities and total number of the one or more intermediary user devices involved in forwarding the communication from the sending user device to the receiving user device.

15. The computer program product of claim 11 wherein the payment token is given by $$\Phi = MAC_{K_{u_o}}(p, L),$$

where p denotes said at least a portion of the communication, L denotes said information indicative of a payment level that would be available if a forwarding intermediary user device is entitled to a payment claim, MAC denotes said message authentication code function, and $K_{u_o}$ is a secret key associated with the sending user device.

16. The computer program product of claim 11 wherein the method further comprises maintaining a connectivity graph comprising a list $\lambda_u$ of triples $(u_i, d_i, L_i)$, where $u_i$ is an identity of a given one of the intermediary user devices with a path of length $d_i$ hops to a closest base station, and where $L_i$ is a reward threshold of the given intermediary device for forwarding packets.

17. The computer program product of claim 16 wherein the list $\lambda_u$ of triples $(u_i, d_i, L_i)$ is sorted in terms of increasing values of $d_i$ with entries having a same value of $d_i$ sorted in terms of increasing values of $L_i$.

18. The computer program product of claim 17 wherein the communication comprises a packet p, and wherein the method further comprises:
selecting a reward level L for the packet p, the reward level L comprising said information indicative of a payment level that would be available if a forwarding intermediary user device is entitled to a payment claim; and
computing $$\mu = MAC_{K_{u_o}}(p, L),$$

where MAC denotes said message authentication code function and $K_{u_o}$ is a secret key associated with the sending user device.

19. The computer program product of claim 18 wherein associating the payment token with the communication comprises assembling a tuple $P=(L, p, u_o, \mu)$.

20. The computer program product of claim 19 wherein the method further comprises selecting one of the intermediary devices for forwarding the communication to, wherein selecting the intermediary user device comprises:
(i) selecting a first entry from the list $\lambda_u$ of triples $(u_i, d_i, L_i)$ for which $L_i \leq L$;
(ii) sending a forwarding request to a given intermediary device having the identity $u_i$ in the selected first entry;
(iii) waiting a pre-set time period $\delta$ to receive an acknowledgement from the given intermediary device;
(iv) responsive to receiving the acknowledgement from the given intermediary device within the pre-set time period $\delta$, forwarding P to the given intermediary device; and
(v) responsive to not receiving the acknowledgment from the given intermediary device within the pre-set time period $\delta$, incrementing i by one and repeating (i)-(v).

* * * * *